United States Patent [19]

Linkner, Jr.

[11] Patent Number: 5,567,022
[45] Date of Patent: Oct. 22, 1996

[54] DUAL CIRCUIT ATTENUATORS AND NETWORK FOR ANTI-LOCK BRAKE SYSTEM

[75] Inventor: Herbert L. Linkner, Jr., Dexter, Mich.

[73] Assignee: Kelsey-Hayes Company, Livonia, Mich.

[21] Appl. No.: 366,750

[22] Filed: Dec. 30, 1994

Related U.S. Application Data

[63] Continuation-in-part of Ser. No. 163,658, Dec. 7, 1993.

[51] Int. Cl.⁶ .................. B60T 8/32; B60T 8/36; B60T 8/48
[52] U.S. Cl. ............... 303/87; 303/116.1; 303/6.01; 303/119.1; 303/115.4
[58] Field of Search ................ 138/26, 30, 31; 303/10, 11, 87, 6.01, 115.1–115.6, 119.1, 116.1–116.4; 417/540, 568; 192/109 F; 60/413; 188/345

[56] References Cited

U.S. PATENT DOCUMENTS

| | | | |
|---|---|---|---|
| 3,640,067 | 2/1972 | Ingram | 188/345 |
| 3,757,825 | 9/1973 | Givens et al. | 138/26 |
| 4,453,782 | 6/1984 | Arikawa et al. | 303/116.2 |
| 4,571,009 | 2/1986 | Jones | 303/87 |
| 4,828,335 | 5/1989 | Fuller et al. | 303/100 |
| 4,986,404 | 1/1991 | Kajitani et al. | 192/109 F |
| 5,143,428 | 9/1992 | Toda et al. | 303/900 X |
| 5,209,554 | 5/1993 | Beilfuss et al. | 303/116.1 |
| 5,363,744 | 11/1994 | Pichler | 138/31 |
| 5,385,395 | 1/1995 | Volz | 303/87 X |

FOREIGN PATENT DOCUMENTS

| | | | |
|---|---|---|---|
| 0491159 | 6/1992 | European Pat. Off. | |
| 1373140 | 8/1964 | France. | |
| 4029846 | 4/1991 | Germany. | |
| 4002635 | 8/1991 | Germany | 303/87 |
| 1-106759 | 4/1989 | Japan. | |
| 404085159 | 3/1992 | Japan | 303/87 |

Primary Examiner—Douglas C. Butler
Attorney, Agent, or Firm—Brooks & Kushman P.C.

[57] ABSTRACT

An anti-lock brake system for a wheeled vehicle having pressure-operated wheel brakes (26',28') with discrete anti-lock brake pump circuits including a solenoid-operated isolation valve (64',66') for each of the wheel brakes, a pressure hold-and-dump control solenoid valve (92',98') for each wheel brake, and a common attenuator (184) for the discrete anti-lock pump circuits, the attenuator providing sound energy absorption and pressure pulse energy dissipation and comprising an elastomeric element that attenuates pressure pulses in each of the discrete circuits, the attenuator action for one circuit complementing the attenuator action of the other circuit, thereby doubling the attenuator effectiveness and improving noise reduction potential.

6 Claims, 8 Drawing Sheets

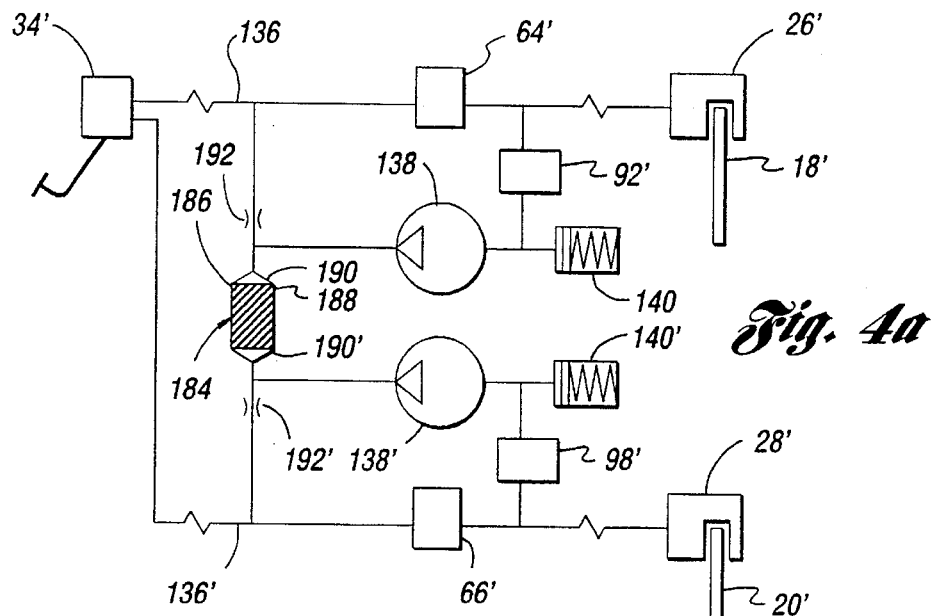
*Fig. 4a*
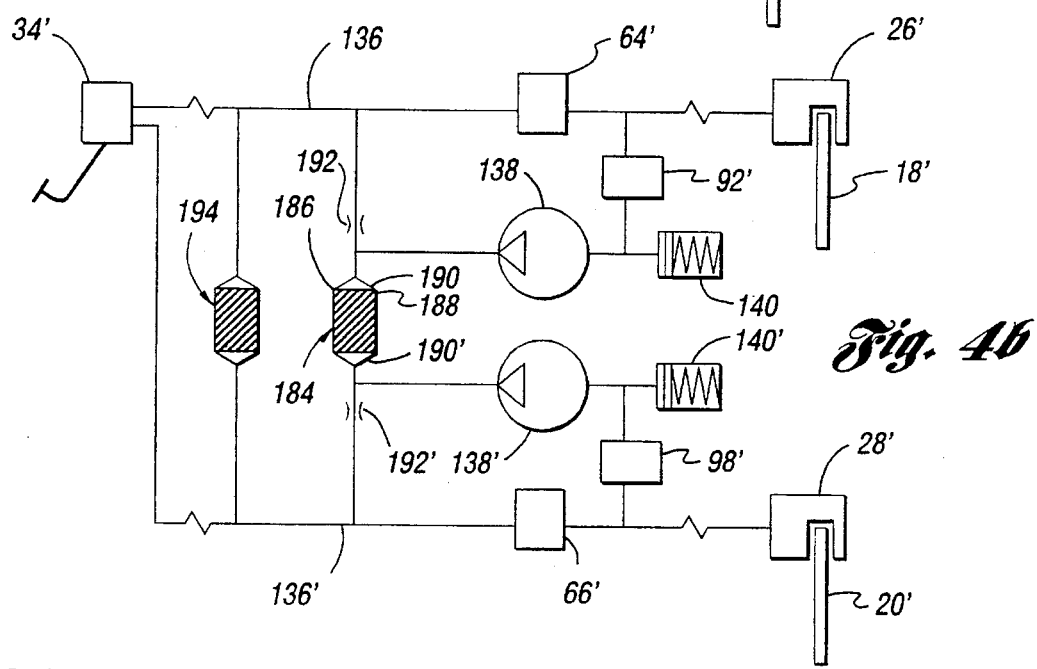
*Fig. 4b*
*Fig. 5a*    *Fig. 5b*    *Fig. 5c*    *Fig. 5d*
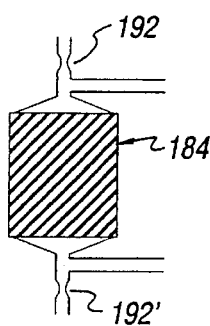 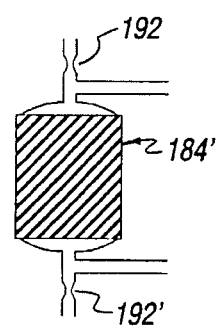 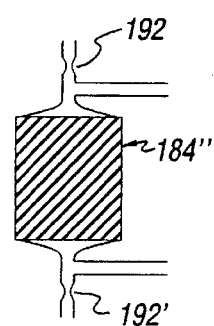 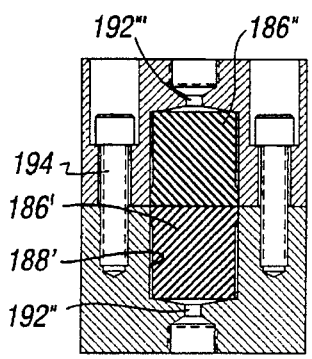

DUAL CIRCUIT ATTENUATORS AND NETWORK FOR ANTI-LOCK BRAKE SYSTEM

REFERENCE TO RELATED PATENT APPLICATION

This patent application is a continuation-in-part of U.S. patent application Ser. No. 08/163,658, filed Dec. 7, 1993.

TECHNICAL FIELD

The invention relates to fluid pressure actuated wheel brakes for an automotive vehicle and to improvements in an anti-lock brake system with improved noise reduction.

BACKGROUND OF THE INVENTION

As is well known in the art, automobile wheels have a tendency to lock, thereby increasing stopping distance, when the vehicle is braked on wet or frozen road surfaces that have low coefficients of friction. Locking of the front wheels also inhibits steering of the vehicle and affects adversely the lateral stability of the vehicle. Anti-lock brake systems generally known in 6he art will maintain slip ratio at the tire road interface at a calibrated value by increasing and decreasing hydraulic brake pressure with a high pulse frequency to prevent the wheels from being locked during braking.

Typically, an anti-lock brake system used in the automobile industry will cause the anti-lock brake system to increase the effective coefficient of friction in direct proportion to slip ratio within a predetermined target slip ratio range. Stability of the vehicle in a lateral direction also changes in accordance with slip ratio, but that relationship is different because lateral stability will deteriorate for any increase in slip ratio. There is no desirable target slip ratio in the control of lateral stability that would correspond to the target slip ratio range for braking forces in the direction of travel of the vehicle.

In known anti-lock brake systems, a master cylinder develops wheel brake pressure in the usual fashion in the absence of wheel slip. If wheel slip is detected, however, the anti-lock brake system will trigger the operation of a solenoid-operated pressure isolation valve that interrupts direct control of the wheel brakes by the master brake cylinder. Hydraulic pressure, during the anti-lock brake control mode, is developed by a hydraulic brake pump, driven by an electric motor, for the purpose of establishing a controlled brake pressure for the wheel brakes. Upon detection of wheel slip, a solenoid-operated hold-and-dump valve located in the brake control circuit relieves pressure at the wheel brakes. An electronic microprocessor controller that responds to speed signals for the vehicle wheels will actuate a pressure isolation valve for each wheel brake and the pressure hold-and-dump valve for each wheel brake to effect a pulsating brake force. The frequency of the pulsations can be controlled by the microprocessor to maintain wheel slip within a desired target slip ratio range.

The operation of the isolation valve and the hold-and-dump valve, in response to the output signals of the microprocessor, has a tendency to develop undesirable pressure pulsations in the anti-lock brake circuits. Further, the hydraulic pressure pump that is used to control brake pressure during the anti-lock brake control mode develops pressure pulsations in the high pressure side of the pump circuit.

Copending patent application Ser. No. 163,658, filed Dec. 7, 1993, describes an elastomeric attenuator assembly that is in fluid communication with the brake pump and with the fluid flow inlet sides of the isolation valves. The attenuator assembly is intended to absorb the energy of the pulse time by compression of the elastomer of the attenuator assembly. Damping orifices are used in cooperation with the elastomer to eliminate pressure pulses, or at least moderate them, thus reducing undesirable noise and vibration in the brake circuits. Patent application Ser. No. 08/163,658 is assigned to the assignee of this invention.

BRIEF DESCRIPTION OF THE INVENTION

The present invention is an improvement in the system described in patent application Ser. No. 08/163,658. It includes an attenuator assembly having an elastomeric element, preferably cylindrical, that is common to the circuits fox each of two wheel brakes. The attenuator is capable of absorbing the energy of the pressure pulses created by the pump and by the solenoid operated valves in each of the fluid pressure circuits for the wheel brakes. The energy absorbing effects developed by the attenuator assembly for one circuit cooperate with and supplement the energy absorbing characteristics for the companion circuit. The attenuator is capable also of dissipating the energy of the pressure pulses. The pump pulses of one of the tandem anti-lock circuit portions are 180° out-of-phase with respect to the pump pulses of the companion circuit.

The noise energy absorption of the attenuator assembly is a function of the Young's modulus of the elastomer during deflection, the length-to-diameter ratio of the elastomer element, the geometry of the walls of the attenuator assembly and the bulk modulus of compression of the elastomeric element.

As in the case of the anti-lock brake system disclosed in U.S. application Ser. No. 163,658, damping orifices are used in combination with the elastomeric attenuator assembly for noise energy dissipation. Noise energy dissipation is determined also by the coefficient of volumetric compression of the elastomer element of the attenuator.

In an alternate embodiment of the invention, a secondary attenuator is used in parallel disposition with respect to a primary attenuator. The secondary attenuator would be adapted specifically to dissipate noise due to pressure pulsations developed at the master brake cylinder line by the solenoid-operated valves for each of the tandem brake control circuits.

BRIEF DESCRIPTION OF THE DRAWINGS

FIG. 4a is a schematic diagram of an anti-lock brake circuit having the improved attenuator assembly of the present invention;

FIG. 4b is a modification of the attenuator assembly and brake control circuit of FIG. 4a;

FIGS. 5a, 5b, 5c, and 5d show various modifications of the attenuator assembly that may be used in the anti-lock brake circuits of FIGS. 4a or 4b;

PARTICULAR DESCRIPTION OF THE INVENTION

Figure 1:
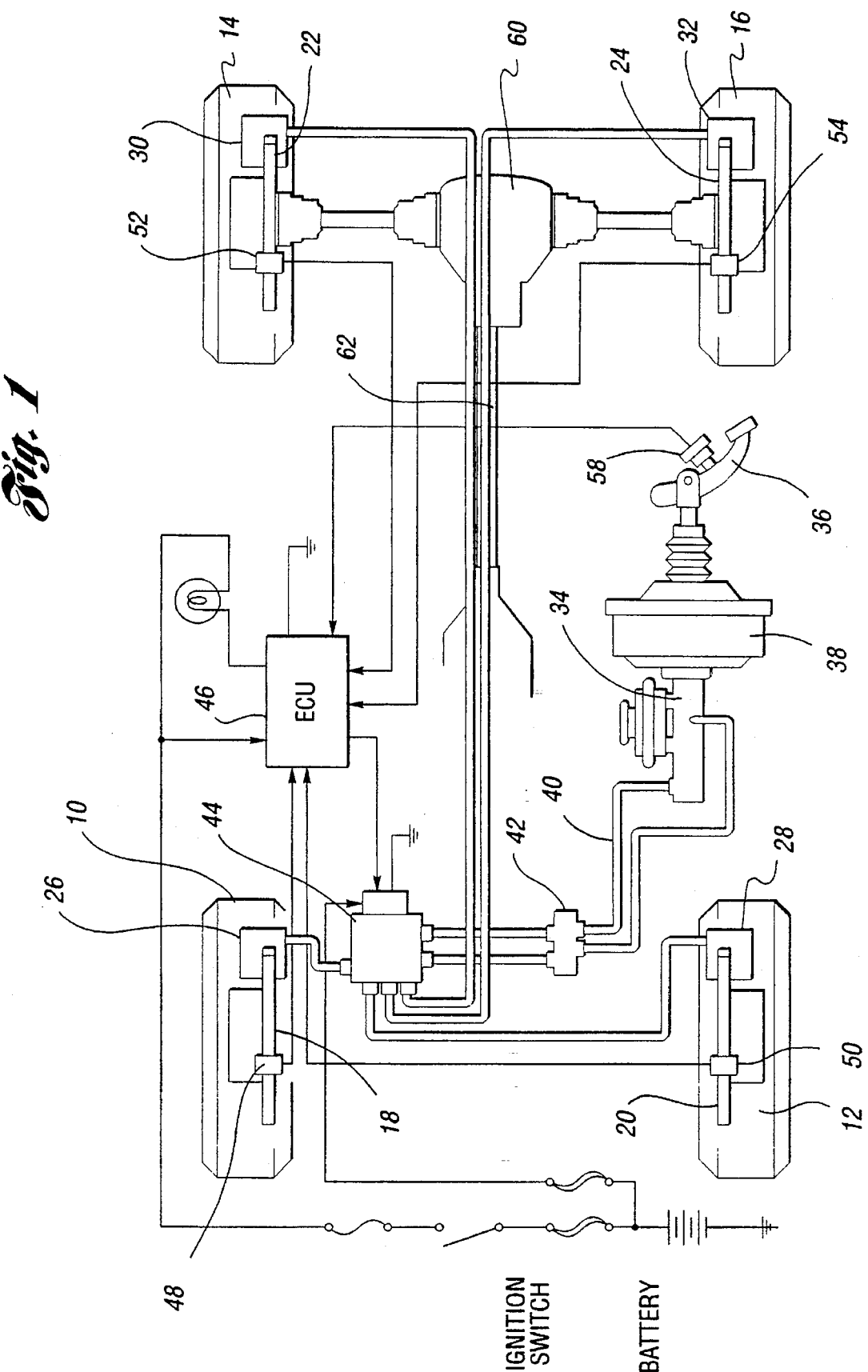
FIG. 1 is a schematic representation of an anti-lock brake system for an automotive vehicle which is adapted to embody the improvements of the invention.

In FIG. 1, a typical automotive vehicle with an anti-lock brake system comprises front steerable wheels 10 and 12 and rear wheels 14 and 16. Each wheel has a wheel brake. Each wheel brake comprises a brake disc as shown at 18, 20, 22 and 24, respectively. Wheel brake cylinders, which may comprise wheel brake pads mounted on brake calipers in the usual fashion, are shown at 26, 28, 30 and 32.

A master brake cylinder 34 is actuated by a driver-operated brake pedal 36. A vacuum booster mechanism, which is well known in the art, augments the force developed by the brake pedal 36, the booster being shown schematically at 38.

The master brake cylinder develops a pressure in wheel brake pressure line 40, which is distributed through pressure balance valve 42 to actuator 44. The improvements of the invention are embodied in the actuator 44, as will be explained subsequently.

The actuator 44 is under the control of the microprocessor 46 (ECU). The microprocessor receives wheel speed sensor signals from front wheel speed sensors 48 and 50 and from rear wheel speed sensors 52 and 54. The wheel speed signals are delivered to the microprocessor 46 through wheel speed sensor circuits, as indicated.

The microprocessor 46 can detect a braking force applied to the brake lever 36, as indicated by the electrical lead extending from brake pedal switch 58.

In the vehicle illustrated schematically in FIG. 1, a rear wheel drive differential-and-axle assembly 60 receives torque from the tailshaft of a transmission, not shown, through driveshaft 62.

Figure 2:
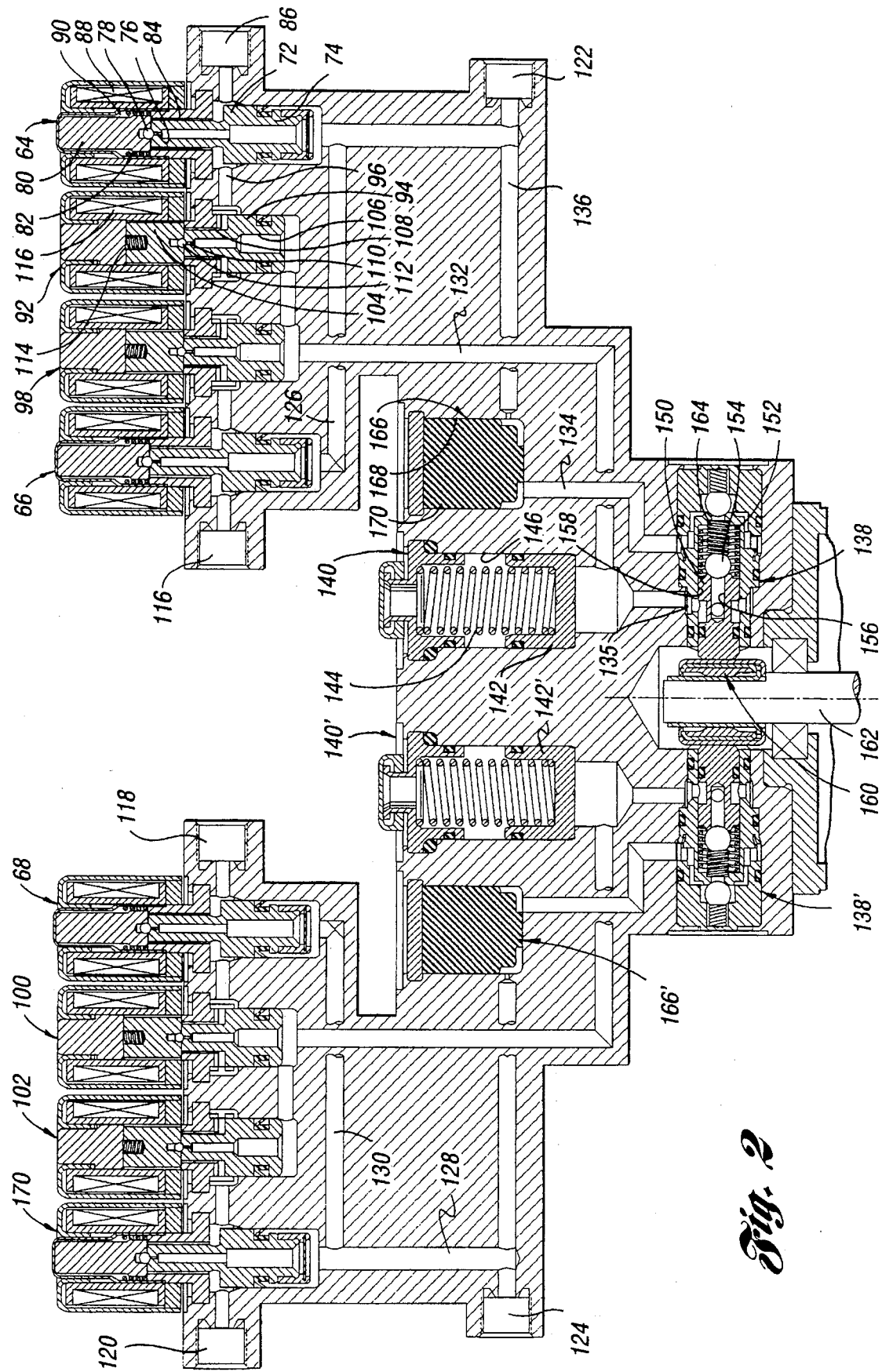
FIG. 2 is a schematic diagram of the pressure circuit for an anti-lock brake system of the kind disclosed in U.S. patent application Ser. No. 163,658.

In FIG. 2, I have shown the hydraulic flow circuit for an anti-lock brake system control of the kind illustrated in FIG. 1. The hydraulic flow schematic valve diagram of FIG. 2 is disclosed in copending patent application Ser. No. 164,658, filed Dec. 7, 1993, which is assigned to the assignee of the present invention. Reference may be made to that copending application. For a particular description of the hydraulic flow circuit of FIG. 2, I will describe the circuit of FIG. 2 only insofar as it may have features that are common to the present invention.

An anti-lock brake system of this kind will simulate a condition in which the operator of a vehicle having conventional wheel brakes will quickly step on and release the brake pedal to avoid locking the wheels. That pumping action, which requires a high degree of driving skill, is simulated by the anti-lock brake system to maintain the tire-road surface slip ratio at a desired value by increasing and decreasing brake pressure to prevent locking of the vehicles.

The valve circuit of FIG. 2 comprises a solenoid-operated brake pressure isolation valve 64 for a front wheel brake. A corresponding brake pressure isolation valve for a rear wheel brake is generally designated by reference numeral 66. A third brake pressure isolation valve for the other rear wheel brake is designated by reference numeral 68. A brake pressure isolation valve for the other front wheel brake is generally shown at 70.

The valves 64–70 are similar in construction. Thus only valve 64 will be described in particular.

Valve 64 comprises a valve body 72 having an internal pressure distribution passage 74. Located at the upper end of valve body 72 is a valve orifice 76, which registers with ball valve element 78. A solenoid armature 80 engages all valve elements 78 and applies a downward force on valve element 78 when the solenoid valve is actuated, thereby sealing the orifice 76.

The armature 80 is moved by valve spring 82 in an upward direction, as viewed in FIG. 2, away from the valve body 72. This allows the ball valve element to be normally open as it establishes communication between passage 74 and radial passages 84, which extend to a first front brake pressure outlet passage 86. Passage 86 communicates with a valve chamber occupied by the valve body 72.

The armature 80 is surrounded by solenoid windings 88. When the windings 88 are energized, armature 80 is moved in a downward direction, as viewed in FIG. 2, causing ball valve element 78 to seat on valve orifice 76 against the opposing force of spring 82. Spring 82 is seated on the valve body 82 and acts against a spring shoulder 90.

A hold-and-dump valve assembly 92 for one of the front brakes comprises a valve body 94 located in a valve chamber which is in fluid communication with the front brake pressure passage 86 through a passage 96. A corresponding hold-and-dump valve indicated generally at 98 is provided for one of the rear brakes. A hold-and-dump valve shown generally at 100 for the other rear brake and a hold-and-dump valve shown generally at 102 for the other front brake correspond in structure and in function to the hold-and-dump valve 92. Therefore, only valve 92 will be described in particular.

A hold-and-dump valve armature 104 is situated in the valve chamber for the valve body 94.

Valve body 94 is provided with a central pressurized fluid delivery passage 106 which communicates with passages 108 through a ball valve orifice 110. A ball valve element 112 is seated on the orifice 110 when the armature 104 is urged in a downward direction by armature spring 114, the latter applying a force to the ball valve element 114.

Solenoid windings 116 surround the armature 104. When the windings are energized, the ball valve 112 is opened, thereby establishing communication between passages 106 and 108.

Each brake has a hold-and-dump valve and a pressure isolation valve which control pressure distribution to the respective brakes. Hold-and-dump valve 98 and pressure isolation valve 76 control pressure distribution to rear brake passage 116. Similarly, hold-and-dump valve 100 and pressure isolation valve 68 control pressure distribution to rear brake passage 118. Further, hold-and-dump valve 102 and pressure isolation valve 70 control pressure distribution to front brake passage 120.

As indicated in the description of FIG. 1, master brake cylinder has two pressure outlet passages which communicate respectively with master cylinder pressure passages 122 and 124. During normal braking with no appreciable wheel slip, pressure from master brake cylinder passage 122 is distributed through the isolation valve 64 by way of passage 74 to front brake pressure distributor passage 86. The isolation valve 64 is normally open, thereby providing free communication between passage 74 and passage 86. The same master brake cylinder pressure in passage 122 is distributed through passage 126 to isolation valve 66. The pressure in passage 126 is distributed through the isolation valve to passage 116 in the same fashion as the pressure distribution pattern described with reference to the isolation valve 64.

Master brake cylinder pressure in the other brake cylinder outlet passage is distributed to passage 124 and through passage 128 and passage 130 to isolation valves 70 and 68, respectively. The front brake pressure passage 120 and the rear brake pressure passage 118 are pressurized in this fashion. If the wheel speed sensors detect a slip greater than the predetermined slip value, the microprocessor will command a signal that will trigger the operation of solenoid valves 64, 66, 68 and 70 if the respective wheel brakes that are controlled by those isolation valves are triggered as a result of the slipping of the respective wheels.

In the case of the front brake communicating with front brake passage 86, the valve 78 will isolate that front brake from the master cylinder 122. Pressure from master brake cylinder passage 122 will be dumped through passage 96 and through the open valve orifice 110 to passage 106. Passage 106 communicates with passage 132, which communicates with the flow inlet port 135 of a hydraulic brake pump 138. This results in an instantaneous decrease in the pressure at the front brake pressure passage 86. When the solenoid valve 64 again is deenergized, the front brake pressure passage 86 again communicates with master brake cylinder passage 122.

The microprocessor will develop pulsating voltages for the respective hold-and-dump valves and the respective isolation valves. During the instant that a signal voltage is present, isolation valve 64 will close and hold-and-dump valve 92 will open, causing an instantaneous decrease in the front brake pressure in passage 86. During the instant that the pulsing voltage decreases, the isolation valve 84 will allow for pressure distribution from brake pump 138 through the isolation valve 64 as hold-and-dump valve 92 closes. This will cause an instantaneous rise in the effective brake pressure in front brake pressure passage 86.

A low pressure accumulator assembly 140 is situated in the pump return passage 132. Fluid that is pumped from the front brake and through the front brake pressure passage 86 may be stored temporarily in the low pressure accumulator 134.

The accumulator 134 comprises an accumulator piston 142 which is spring-loaded by accumulator spring 144. It is situated in accumulator chamber 146.

The pump 138 comprises a pump piston 150 which is spring-biased in a left-hand direction, as viewed in FIG. 2, by pump spring 152. A ball check valve 154 is located in central cylinder passage 156 which communicates through port 135 with passage 132. The piston 150 is stroked in a pump cylinder 158 by a driveshaft having an offset axis indicated generally at 160. The pump driveshaft is driven by a pump drive motor.

Ball check valve 154 closes when the piston 150 is stroked. It opens, however, when the piston returns under the force of spring 152. Secondary spring 164 normally urges the ball valve element 154 against its valve seat in passage 156. This valve element is a relief valve that prevents a pressure overload.

The pump 138 is a reciprocating pump which distributes fluid under pressure to passage 136. The pump develops pressure pulsations that must be attenuated in order to eliminate noise and pressure peaks in the hydraulic circuit. For this purpose, an attenuator assembly 166 is situated in passage 136. The attenuator comprises an attenuator chamber 168 in which is positioned an elastomeric element 170, which is compressible and which is calibrated to attenuate pressure pulsations. It may be formed of ethylene propylene, silicon rubber or butyl rubber. Materials of this kind may be purchased commercially from suppliers such as Minnesota Rubber Company of Minneapolis, Minn. The bulk modulus for the element 170 can be chosen so that its value is compatible with the bulk modulus of the brake fluid itself to provide pressure noise pulse absorption. The absorption due to the volumetric compression of the elastomer is a function of the volume of the elastomer and its bulk modulus.

The attenuator element 170 serves to provide absorption of pressure pulses also for the rear brake that communicates with rear brake passage 116. The pressure pulsations occur by reason of the operation of the hold-and-dump valve 98 and the pressure isolation valve 66 as well as the pump. These valves function in a manner similar to the corresponding valves 92 and 64, respectively.

The brake pump is a double-acting pump. It includes a separate pump assembly 138' corresponding to pump assembly 138. Pump assembly 138' serves the isolation valves 68 and 70, as well as the hold-and-dump valves 100 and 102. The valves 68, 70, 100 and 102 form a part of a brake circuit together with attenuator assembly 166' and low pressure accumulator 142'. This is essentially a duplicate of the circuit described with respect to isolation valve 64 and 66 and the hold-and-dump valves 92 and 98.

Figure 3:
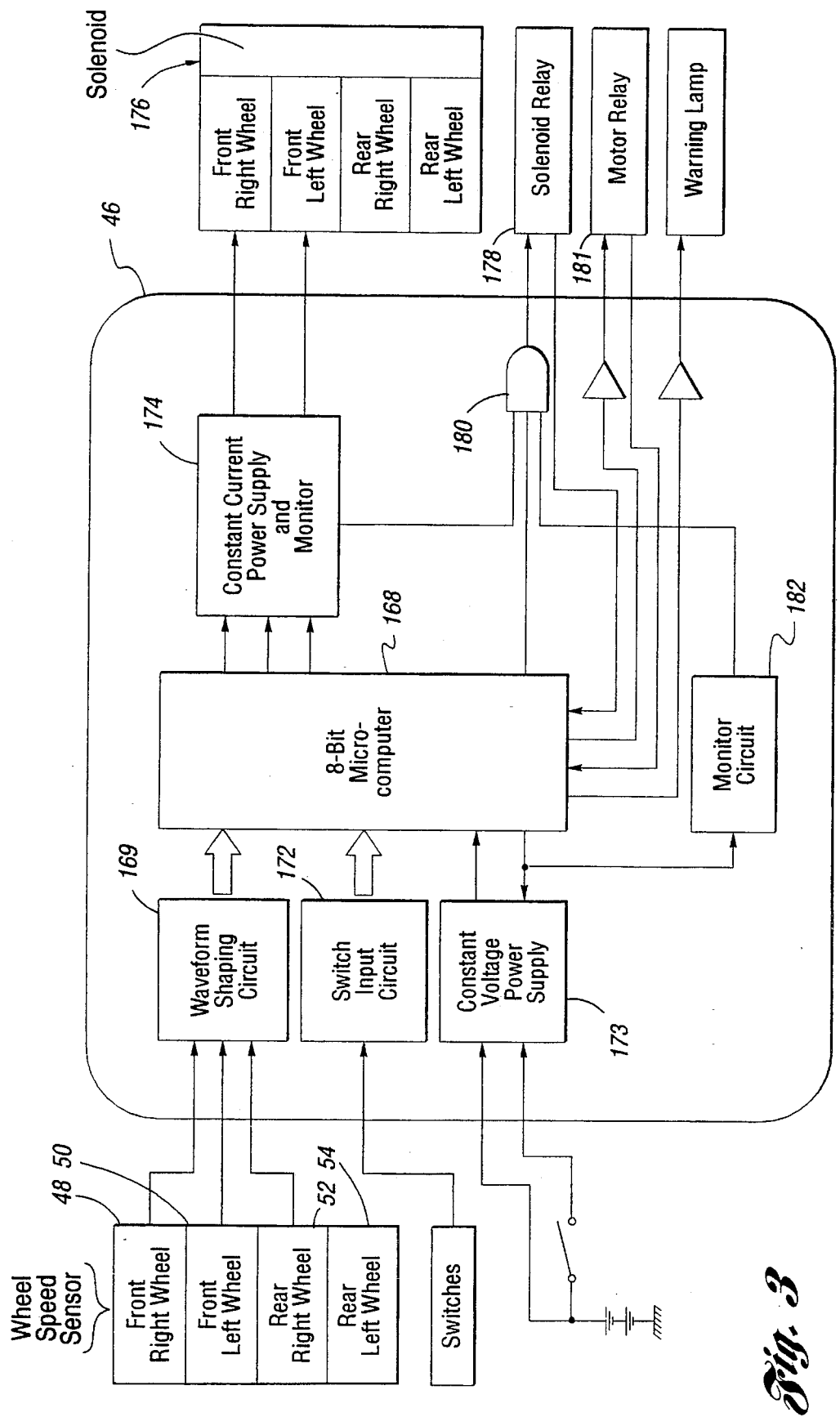
FIG. 3 is a schematic representation of an anti-lock brake control microprocessor.

FIG. 3 shows the microprocessor control circuit as indicated. The microprocessor is an 8-bit microcomputer 168 which forms a part of the electronic control unit 46. It is adapted to receive input signals from the wheel speed sensors 48, 50, 52 and 54. The signals received from the sensors pass through a waveform shaping circuit 169. The various switches in the anti-lock brake system communicate with the microcomputer through a switch input circuit 172. A constant voltage power supply, which communicates with the vehicle engine ignition switch, is shown at 173.

The voltage is received by the microcomputer 168. A constant current power supply and monitor circuit 174 delivers the output of the microcomputer to the solenoid circuits for the two front wheels and the two rear wheels. This is generally indicated at 176 in FIG. 3. A solenoid relay is supplied with power from the power supply 174 as indicated at 178, and "AND" gate 180 receives input from the microcomputer and from a monitor circuit 182 to selectively energize the solenoid relay circuit 178 for the wheel brake solenoid valves. Similarly, a motor relay circuit 181 is triggered by the microprocessor when the pump 138/138' is activated.

As seen in FIG. 4a, the improvement of the invention comprises a dual circuit for each of two wheel brake discs 18' and 20'. These would generally correspond to the wheel brake discs 18 and 20 described with reference to FIG. 1. Wheel cylinders 26' and 28', respectively, act on discs 18' and 20'.

The isolation solenoid valve for wheel brake 26' is shown at 64' and the hold-and-dump solenoid valve is shown at 92'. The hold-and-dump valve and the isolation valve for brake cylinder 28' are shown respectively at 98' and 66'. The low pressure accumulators for brake cylinders 26' and 28' are respectively shown at 140 and 140'.

In the case of the circuit shown in FIG. 4a, a single attenuator is used for the output pressure distribution of each of the pump circuits. The single attenuator assembly for the pump circuits for pumps 138 and 138' is generally designated at 184. It comprises a single elastomeric element 186 enclosed in an attenuator chamber 188. Each end of the chamber 188 is provided with a conical end wall shown at 190 and 190'. The single attenuator 184 serves both anti-lock circuits for the pumps 138 and 138', respectively.

The noise pulses developed by the pump in the anti-lock brake system are out-of-phase. These pulses cause compression or bending of the elastomeric element 186 of the attenuator assembly 184.

The sound energy absorption developed by the attenuator assembly 184 is a function of the Young's Modulus, the length-to-diameter ratio of the elastomeric element, the bulk modulus of the elastomer and the geometry of the attenuator members. The damping characteristics of the attenuator are determined by the Young's modulus due to deformation of the elastomer, the damping coefficient of the elastomer due to volumetric compression and the damping orifice 192 and 192'.

Damping orifices 192 and 192' are located in communication with passages 136 and 136' which, as explained earlier, connect the master cylinder shown at 34' with the isolation solenoids 64' and 66', respectively. These orifices 192 and 192' serve as damping orifices for noise energy dissipation. The volume of attenuator chamber 190 of the attenuator assembly 184 is decreased as the volume of the other attenuator chamber 190' increases. The damping orifice for one chamber, therefore, will complement the attenuating effect of the companion orifice for the other chamber.

The compression of the elastomer element 186 due to a pressure pulse in passage 136' will result in a pressure feedback from the attenuator assembly 184 to the pressure passage 136. Conversely, a pressure pulse in passage 136 will result in the simultaneous pulse in pressure passage 136'. The energy of these pressure pulses is dissipated by each orifice, thereby further augmenting the attenuating effect of the common attenuator assembly 184. This provides improved attenuator effectiveness due to the fact that a common attenuator serves both pump circuits for pumps 138 and 138'.

The overall space requirement for packaging purposes is decreased because of the doubling of the attenuator effectiveness. The overall variable cost for manufacturing the improved anti-lock brake system of FIG. 4a, furthermore, is decreased because of the improved attenuator effectiveness. The improved efficiency of the attenuator assembly will result in a reduced load on the pump, reduced vibrations at the pump and reduced current levels for the pump drive motor.

It is possible to provide for different attenuating characteristics, depending upon the requirements of a particular application. As mentioned previously, the geometry of the attenuator chamber of FIGS. 4a and 5a, which is cylindrical as shown, includes conical end walls. If desired, a parabolic end wall configuration can be used as indicated in FIG. 5b. If desired, a hyperbolic configuration for the end walls of the attenuator chamber can be used as indicated in FIG. 5c. The geometry of the end walls can be chosen by making empirical design choices, depending upon the operating requirements of a particular system. In the case of FIGS. 5b and 5c, similar reference characters are used to designate the modified chamber for the elastomer, although prime notations are added.

FIG. 5d shows a variation of the attenuator assemblies described with reference to FIGS. 5a, 5b and 5c. It comprises an elastomer element formed in two parts 186' and 186" situated in end-to-end relationship in a common attenuator chamber 188'. A small clearance exists between the cylindrical surfaces of the elastomer element parts and the surrounding wall of chamber 188'.

The attenuator assembly of FIG. 5d comprises two housing parts joined together by threaded fasteners 194 as shown. The innermost ends of the elastomer parts form a tight seal against the surrounding wall of the chamber 188' thereby sealing the anti-lock brake circuit from the companion circuit. The clearance between the elastomer element parts 186' and 186" with respect to the wall of the chamber 188' facilitates assembly of the elastomeric element parts and accommodates displacement in a radial direction.

The damping orifices for the assembly of FIG. 5d may be formed in the housing for the chamber 188' as shown at 192" and 192'''.

FIG. 4b shows a modified anti-lock circuit that uses two attenuators in parallel. The embodiment of FIG. 4b is essentially similar to the embodiment of FIG. 4a except that a secondary attenuator assembly 198 is situated in parallel with attenuator assembly 184. The attenuator assembly 184 in the embodiment of FIG. 4a would not be capable of absorbing pressure pulse energy developed by the opening and closing of the isolation solenoid 64' or the isolation solenoid 66'. That is because the damping orifices 192 and 192' in the embodiment of FIG. 4a would semi-isolate the attenuator 184 from the isolation solenoids. Thus, the opening and closing of the isolation solenoids may develop pressure pulses, but the pulsation energy developed by those pulses will effectively be absorbed or dissipated by the attenuator assembly 194.

Figure 6A:
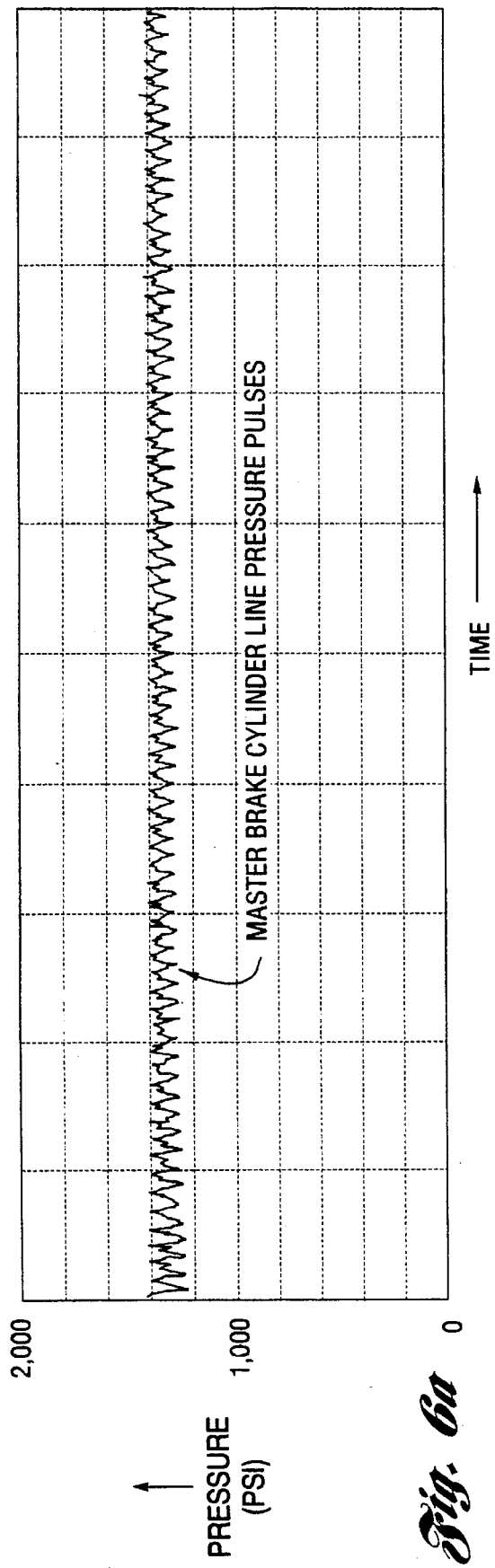
FIG. 6a is a trace developed from testing an actual anti-lock brake system for an automotive vehicle showing the brake pump pressure pulses, plotted against time, at the master brake cylinder line.
Figure 6B:
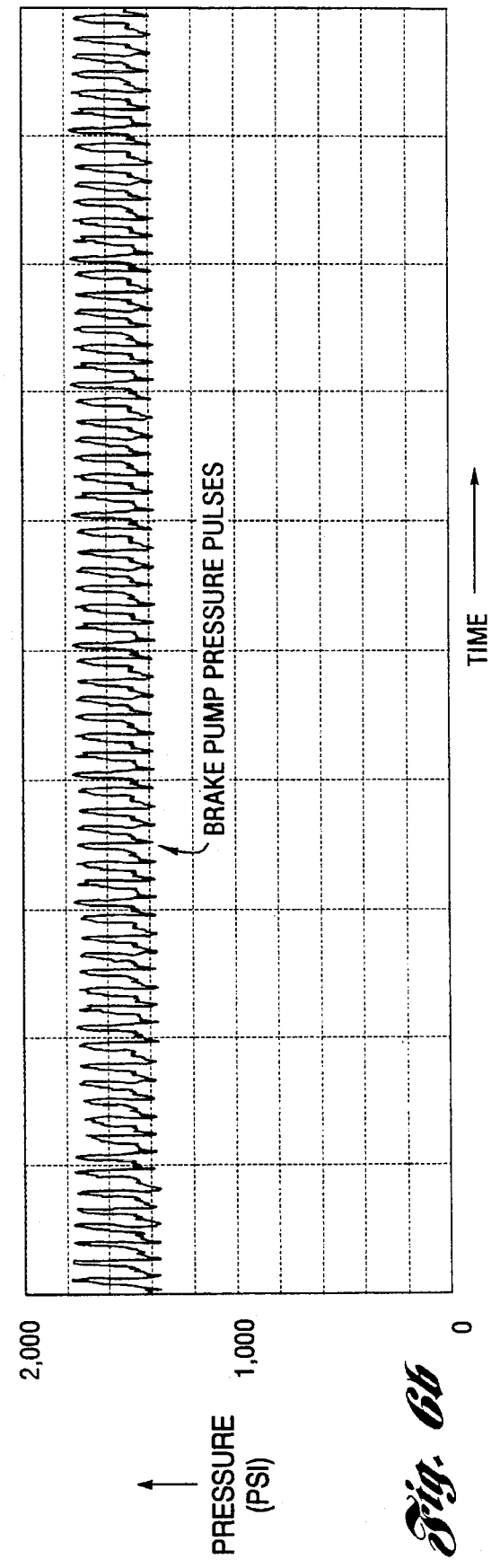
FIG. 6b is a trace for the vehicle brake system of FIG. 6a showing the brake pump pressure pulses at the pump.
Figure 8A:
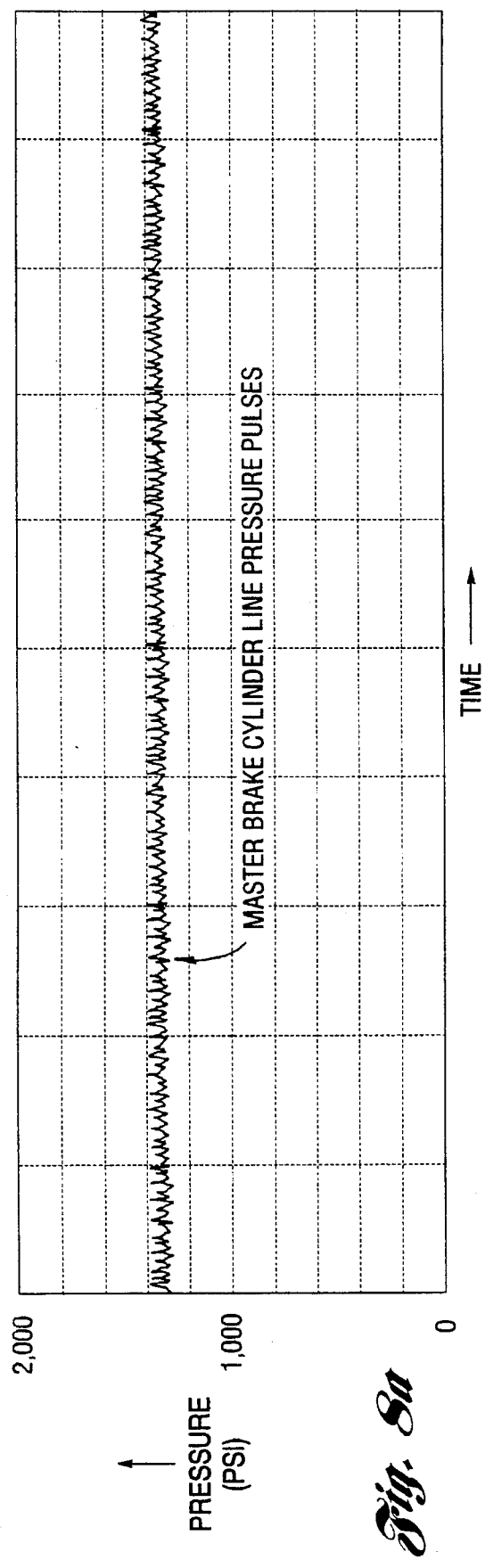
FIGS. 8a and 8b are a trace corresponding to the trace of FIG. 6a wherein the system includes the attenuator of the present invention.
Figure 8B:
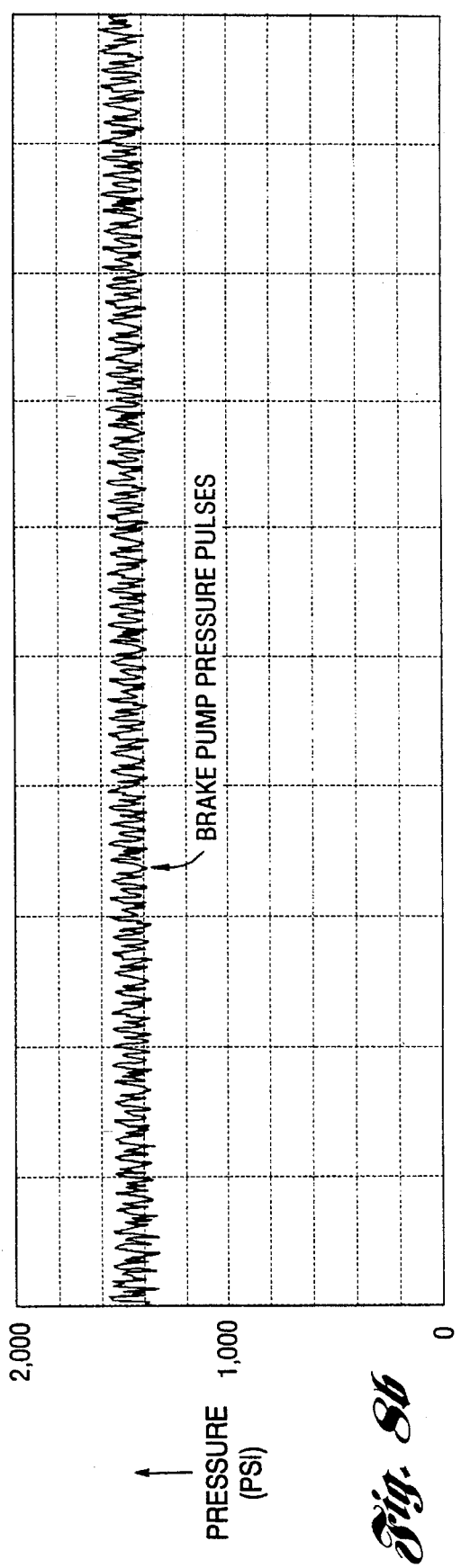

FIG. 6b shows a trace of the pump pressure versus time for a conventional system without the attenuator of the present invention. FIG. 6a shows a corresponding trace for the pump pressure pulses at the master brake cylinder line. The pump pressure pulses in each instance are substantial. FIGS. 8b and 8a show the corresponding traces for a system that includes the attenuator of the present invention. It can be seen that the pressure pulses at the pump and the attenuated pressure pulses at the master brake cylinder line are significantly reduced in magnitude when the attenuator of the present invention is used.

The fundamental frequency in a typical anti-lock brake system for a vehicle that was tested both with and without the improved attenuator of the present invention is about 70 Hz. This can be seen by referring to the pressure versus frequency plots of FIGS. 7a, 7b, 9a and 9b.

Figure 7A:
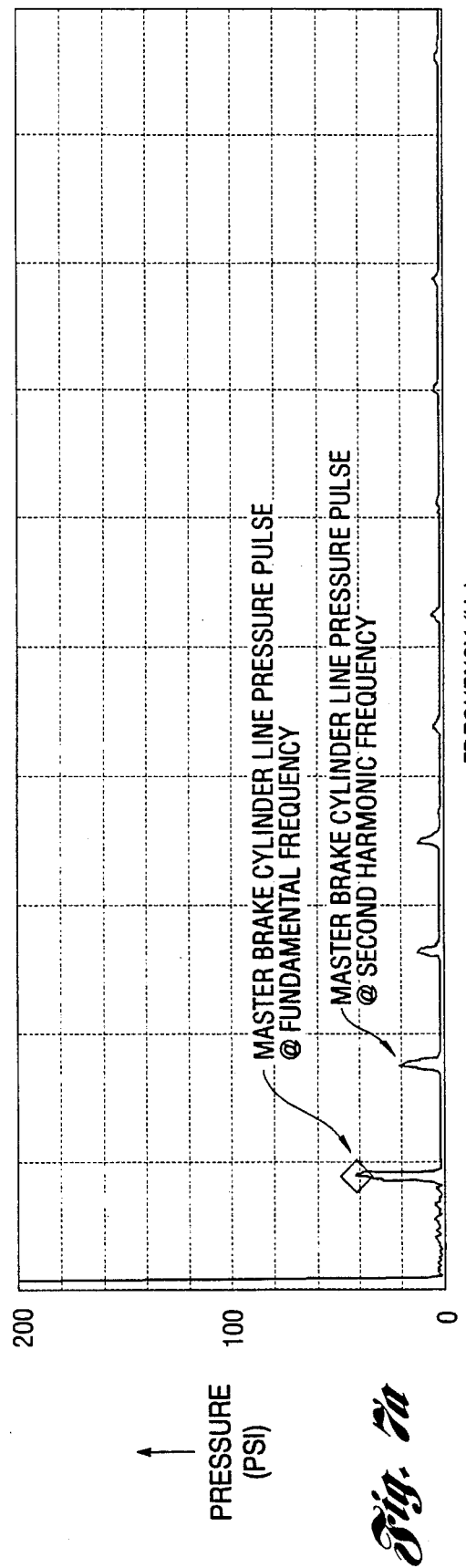
FIG. 7a is a trace corresponding to the plot of FIG. 6a but showing the pressure plotted against frequency rather than against time.
Figure 7B:
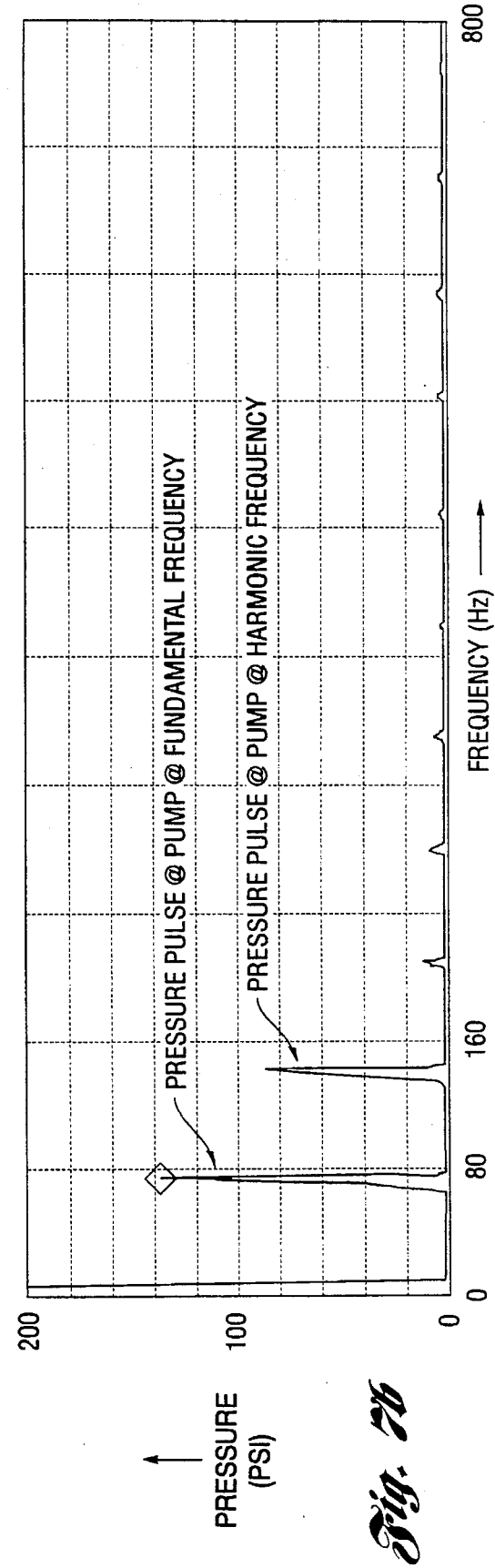
FIG. 7b is a trace corresponding to the plot of FIG. 6b but showing the brake pump pressure pulses plotted against frequency rather than against time.

As seen in FIG. 7b, a conventional system would be characterized by a relatively high fundamental pump pressure pulse of 140 psi at a frequency of 70 Hz. This would cause a relatively high pressure pulse of 40 psi at the master brake cylinder line at a frequency of 70 Hz as seen in FIG. 7a.

The second harmonic of the fundamental frequency, seen in FIG. 7a and 7b, is 140 Hz. The brake pressure pulses at the second harmonic for the pump pulses, as seen in FIG. 7b, are 90 psi. These brake pressure pulses result in second harmonic pressure pulses of 20 psi for the master brake cylinder line, as seen in FIG. 7a.

Figure 9A:
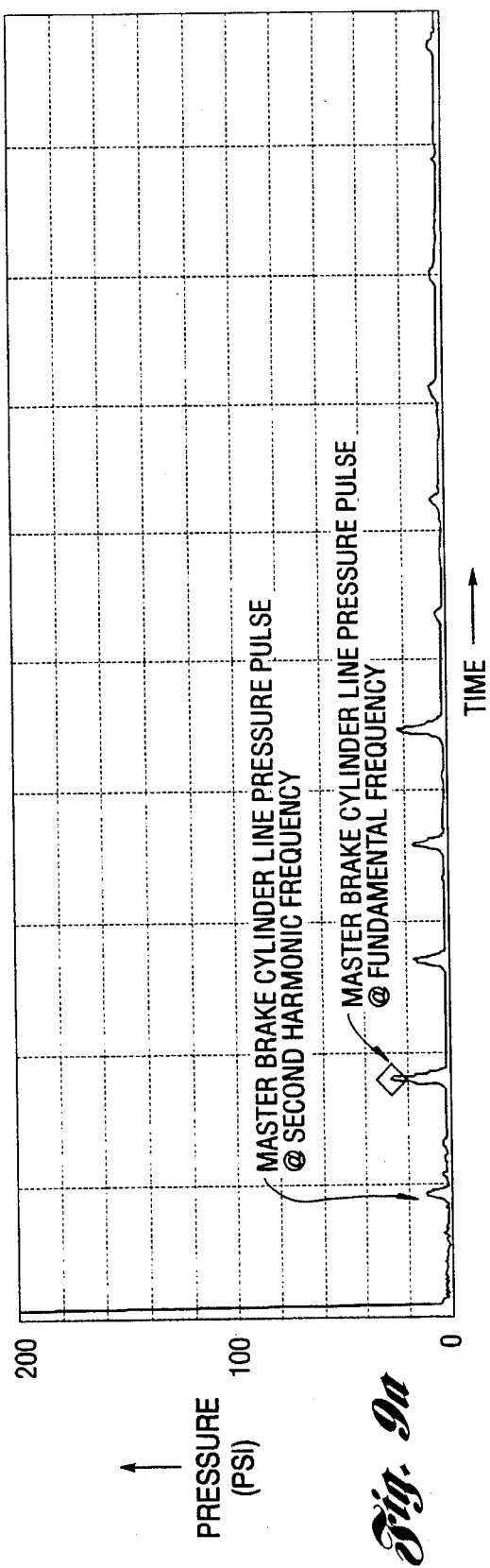
FIG. 9a is a trace corresponding to the trace of FIG. 7a wherein the system includes the attenuator of the present invention.
Figure 9B:
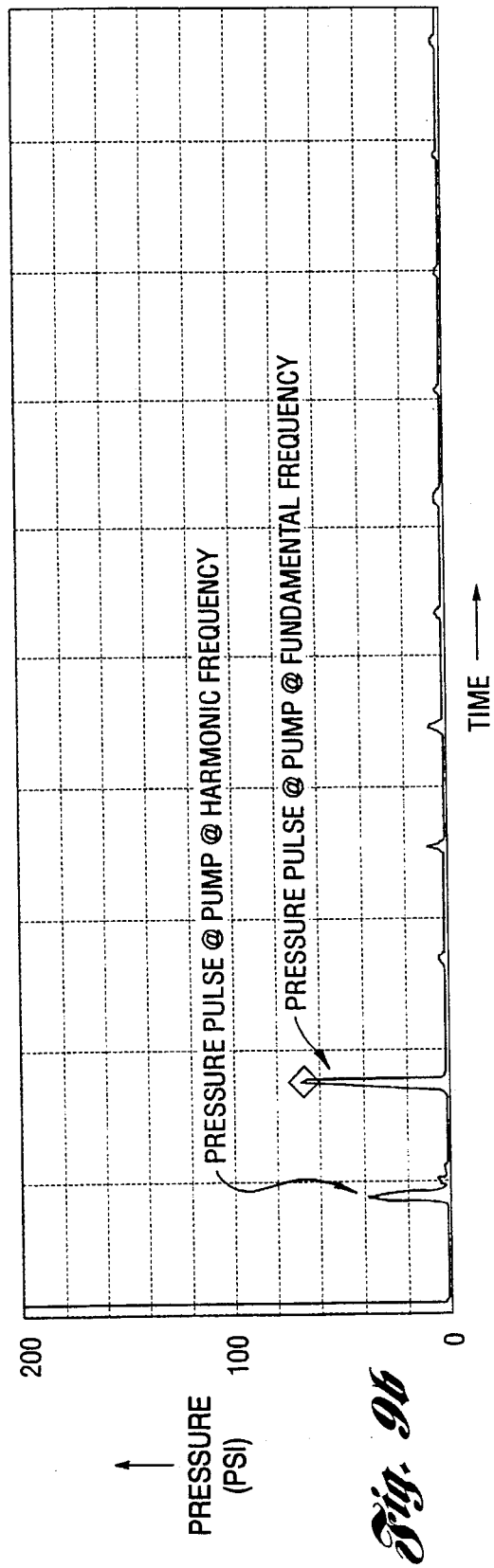
FIG. 9b is a trace corresponding to the trace of FIG. 7b wherein the system includes the attenuator of the present invention.

FIGS. 9a and 9b show the effects of using the attenuator of the present invention. As seen in FIG. 9b, the magnitude of the pressure pulses at the pump outlet in the system of the invention is significantly reduced to about 40 psi at the fundamental frequency of 70 Hz. This results in reduced pressure pulses at the master brake cylinder line of about 10 psi at the fundamental frequency as seen in FIG. 9a.

The pressure of the pulses corresponding to the second harmonic in the system of the invention is moderately reduced from about 90 psi, as seen in FIG. 7b, to about 70 psi, as seen in FIG. 9b.

Various other modifications of the invention will readily be apparent to those skilled in the art within the scope of the invention as defined by the following claims.

Having described preferred embodiments of my invention, what I claim and desire to secure by U.S. Letters Patent is:

1. An anti-lock brake system for a wheeled vehicle having fluid pressure actuated wheel brakes comprising a brake master cylinder, first and second brake pressure passages respectively connecting said brake master cylinders with separate ones of said wheel brakes;

a first pressure isolation solenoid valve means in said first pressure passages for alternatively blocking and establishing fluid pressure distribution to one of said wheel brakes and a second pressure isolation solenoid valve means in said second pressure passage for alternatively blocking and establishing fluid pressure distribution to another of said wheel brakes, each pressure isolation solenoid valve means having a fluid pressure flow inlet side and a fluid pressure flow outlet side;

a first brake pump assembly having a high pressure side and a low pressure side, said high pressure side being connected to said flow inlet side of said first pressure isolation solenoid valve means and a second brake pump assembly having a high pressure side and a low pressure side, said high pressure side of said second brake pump assembly being connected to said flow inlet side of said second pressure isolation solenoid valve means;

first and second solenoid operated hold-and-dump valve means respectively connected between said low pressure side of said first brake pump assembly and said flow outlet side of said first pressure isolation solenoid valve means and between said low pressure side of said second brake pump assembly and said flow outlet side of said second pressure isolation valve;

a common pressure pulse attenuator assembly communicating directly with said flow inlet side of each of said pressure isolation solenoid valve means, said attenuator assembly comprising a compressible member, an attenuator container surrounding said compressible member, two attenuator cavities at spaced regions of said attenuator container, one attenuator cavity being connected to said high pressure side of said first brake pump assembly and the other of said attenuator cavities being connected to said high pressure side of said second brake pump assembly;

said compressible member being cylindrical with first and second end walls defining in part first and second attenuator cavities, said container having a cylindrical wall, said compressible member having a cylindrical surface that is sized to effect sealing engagement with said cylindrical wall thereby hydraulically isolating said high pressure sides of said pump assemblies, one with respect to the other, whereby noise energy is absorbed as a function of length-to-diameter ratio of said compressible member and the Young's modulus of said compressible member during deflection.

2. The combination as set forth in claim 1 wherein said brake system comprises a first low pressure accumulator disposed between said low pressure side of said first brake pump assembly and said first hold-and-dump valve means; and a second low pressure accumulator disposed between said low pressure side of said second brake pump assembly and said second hold-and-dump valve means.

3. The anti-lock brake system of claim 1 including a second pressure pulse attenuator assembly with internal cavities disposed in parallel with said common pressure pulse attenuator assembly between the flow inlet sides of said first and second pressure isolation solenoid valve means.

4. The combination as set forth in claim 1 wherein at least one of said attenuator cavities has a geometric shape that is empirically defined for maximum attenuation.

5. The anti-lock brake system of claim 1 including calibrated flow restricting orifices disposed between said high pressure sides of each of said pumps and said flow inlet sides of said pressure isolation solenoid valve means.

6. The anti-lock brake system of claim 1 wherein said compressible member is formed in two parts situated in end-to-end relationship in said container, said container having a cylindrical wall, one portion of said compressible member parts being sized relative to said cylindrical wall to provide a clearance therebetween to accommodate deflection of said parts as said attenuator assembly is subjected to pressure pulses; and another portion of each compressible member part being sized relative to said cylindrical wall to effect a sealing engagement therebetween, thereby hydraulically isolating said high pressure sides of said pump, one with respect to the other, whereby noise energy is absorbed as a function of length-to-diameter ratio of said compressible member, the Young's modulus of said compressible member and the bulk modulus of said compressible member.

\* \* \* \* \*